United States Patent
Moritomo

(10) Patent No.: US 9,542,078 B2
(45) Date of Patent: Jan. 10, 2017

(54) COMMUNICATION APPARATUS, COMMUNICATION APPARATUS CONTROL METHOD, AND PROGRAM

(71) Applicant: CANON KABUSHIKI KAISHA, Tokyo (JP)

(72) Inventor: Kazuo Moritomo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 14/391,677

(22) PCT Filed: Mar. 29, 2013

(86) PCT No.: PCT/JP2013/002162
§ 371 (c)(1),
(2) Date: Oct. 9, 2014

(87) PCT Pub. No.: WO2013/153759
PCT Pub. Date: Oct. 17, 2013

(65) Prior Publication Data
US 2015/0074540 A1    Mar. 12, 2015

(30) Foreign Application Priority Data

Apr. 13, 2012 (JP) .................................. 2012-092212

(51) Int. Cl.
*G06F 3/00* (2006.01)
*G06F 3/0482* (2013.01)
(Continued)

(52) U.S. Cl.
CPC ......... *G06F 3/0482* (2013.01); *G06F 3/04842* (2013.01); *H04L 41/22* (2013.01);
(Continued)

(58) Field of Classification Search
CPC ....................... G06F 3/04842; H04W 84/12
(Continued)

(56) References Cited

U.S. PATENT DOCUMENTS 8,863,198 B2 * 10/2014 Sirpal ...................... H04N 5/44
348/553
8,881,205 B2 * 11/2014 Friedman .............. G06F 1/1626
715/835
(Continued)

FOREIGN PATENT DOCUMENTS

EP          2170001 A1     3/2010
JP       2006-197122 A     7/2006
(Continued)

OTHER PUBLICATIONS

Yusuke Furuta, Wi-Fi Book: Public Wireless LAN Thorough Use Guide, book, Aug. 9, 2010, pp. 77,100, and 101, ISBN 978-4-7981-2187-1C3055, Publisher: Shoeisha Kabushiki Kaisha, Tokyo, Japan (English-language relevance version of the search report).
(Continued)

*Primary Examiner* — William Titcomb
(74) *Attorney, Agent, or Firm* — Canon U.S.A., Inc. IP Division

(57) ABSTRACT

A communication apparatus includes a detection unit and a display control unit. The detection unit detects a network. The display control unit causes a display unit to display information. In a case where information about a provider providing a network is not obtained from the network detected by the detection unit, the display control unit causes the display unit to display identification information about the network. In a case where information about a provider providing the network is obtained from the network, the display control unit causes the display unit to display information about the provider instead of causing identification information about the network to be displayed.

11 Claims, 13 Drawing Sheets

(51) Int. Cl.
*H04W 48/16* (2009.01)
*G06F 3/0484* (2013.01)
*H04L 12/24* (2006.01)
*H04W 48/18* (2009.01)
*H04W 84/12* (2009.01)
*H04W 12/08* (2009.01)

(52) U.S. Cl.
CPC ......... *H04W 48/16* (2013.01); *H04W 48/18* (2013.01); *H04W 12/08* (2013.01); *H04W 84/12* (2013.01)

(58) Field of Classification Search
USPC ........................................................ 715/739
See application file for complete search history.

(56) References Cited

U.S. PATENT DOCUMENTS

| | | | | |
|---|---|---|---|---|
| 8,977,973 | B2* | 3/2015 | O'Leary | G06Q 10/10 715/765 |
| 9,037,696 | B2* | 5/2015 | Jenkins | H04L 67/22 709/217 |
| 9,182,890 | B2* | 11/2015 | Kang | G06F 3/0483 |
| 9,219,662 | B2* | 12/2015 | Lim | H04N 21/4122 |
| 2007/0157105 | A1* | 7/2007 | Owens | H04L 67/36 715/771 |
| 2008/0032736 | A1 | 2/2008 | Bari | |
| 2011/0243124 | A1* | 10/2011 | Huntley | H04M 7/0084 370/352 |
| 2012/0076117 | A1 | 3/2012 | Montemurro | |
| 2013/0046869 | A1* | 2/2013 | Jenkins | H04L 67/22 709/223 |
| 2014/0080428 | A1* | 3/2014 | Rhoads | G06F 17/30241 455/88 |
| 2015/0199084 | A1* | 7/2015 | Velusamy | G06F 3/04842 715/716 |
| 2016/0054905 | A1* | 2/2016 | Chai | G06F 3/0481 715/719 |

FOREIGN PATENT DOCUMENTS

| | | |
|---|---|---|
| JP | 2007-081987 A | 3/2007 |
| JP | 2007-251884 A | 9/2007 |
| JP | 2010-500791 A | 1/2010 |
| KR | 10-2005-0051050 A | 6/2005 |
| KR | 10-2010-0035061 A | 4/2010 |
| WO | 2008-051938 A2 | 5/2008 |

OTHER PUBLICATIONS

Yusuke Furuta, Wi-Fi Book: Public Wireless LAN Thorough Use Guide, book, Aug. 9, 2010, pp. 77,100, and 101, ISBN 978-4-7981-2187-1C3055, Publisher: Shoeisha Kabushiki Kaisha, Tokyo, Japan (translation of the information into English).

Ranveer Chandra, Beacon-Stuffing: Wi-Fi Without Associations, workshop, Mar. 1, 2007, pp. 53-57, Eighth IEEE Workshop on Mobile Computing Systems and Applications, XP031165179, Westin La Paloma, Tucson, Arizona.

* cited by examiner

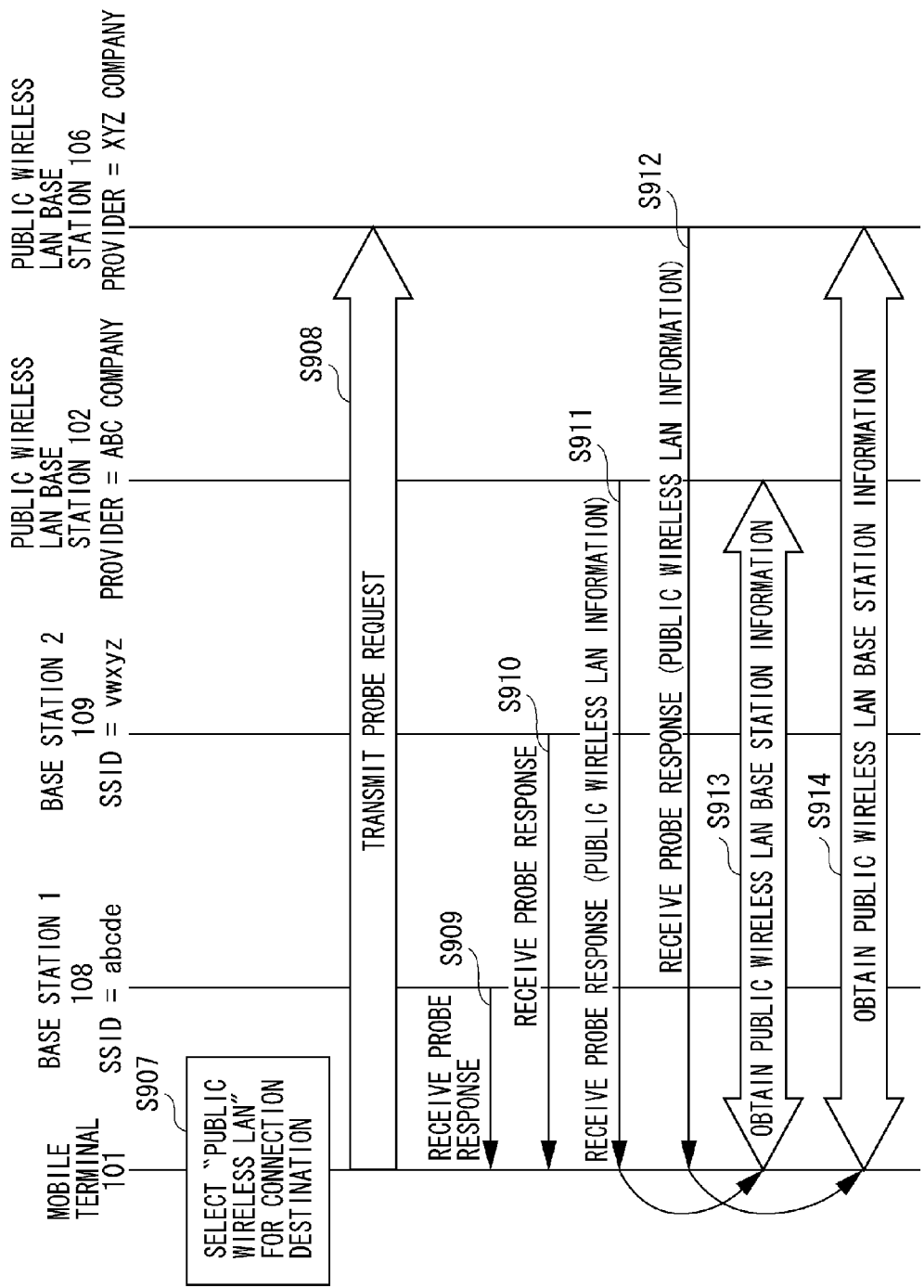

COMMUNICATION APPARATUS, COMMUNICATION APPARATUS CONTROL METHOD, AND PROGRAM

CROSS REFERENCE TO RELATED APPLICATIONS

This application is a National Stage filing of PCT application No. PCT/JP2013/002162, filed Mar. 29, 2013, which claims priority from Japanese Patent Application No. 2012-092212, filed Apr. 13, 2012, all of which are hereby incorporated by reference herein in their entirety.

TECHNICAL FIELD

The present invention relates to a communication apparatus, a communication apparatus control method, and a program.

BACKGROUND ART

Recently, public wireless local area network (LAN) services that allow wireless LAN communication supporting the Institute of Electrical and Electronics Engineers (IEEE) 802.11 series standards are available in public facilities such as train stations, airports, hotels, restaurants and the like. To utilize a public wireless LAN service, it is necessary for a user to acquire a user account, namely, a login user ID and a user password, provided by the provider of that public wireless LAN service. The main methods for utilizing public wireless LAN services are as follows.

First, a terminal used by the user searches for a wireless network established by wireless base stations (hereinafter, "base stations") which are called public wireless LAN access points. By analyzing beacons that are periodically broadcast by the base stations, the terminal can learn an identifier of the network (i.e., service set identifier, SSID), a frequency channel, a radio wave strength, and a security setting state (Japanese Patent Application Laid-Open No. 2006-197122). The terminal notifies the user of the thus-obtained information together with the SSID. The user selects the network that he/she wants to wirelessly connect to from the notified SSID.

The user terminal then can user the public wireless LAN service by wirelessly connecting to the selected network, and being authorized by an authorization sever connected to the base station with use of the user account. During this operation, if the terminal connects to a network provided by a provider different from the operator that provided the user account, authorization by the authorization sever fails, so that the terminal cannot use the public wireless LAN service.

However, conventionally, when selecting the network to connect to from among a plurality of networks, the user has referred to the SSID, the frequency channel, the radio wave strength, and the security setting state. Therefore, it has been difficult for the user to identify which among the plurality of networks is the network provided by the LAN service provider corresponding to the user account that the user has.

Therefore, the present invention is directed to enabling a user to easily identify a network provided by a provider corresponding to a user account that the user has when the user utilizes a public wireless LAN service.

CITATION LIST

Patent Literature

PTL 1: Japanese Patent Application Laid-Open No. 2006-197122

SUMMARY OF INVENTION

According to an aspect of the present invention, a communication apparatus includes a detection unit configured to detect a network, and a display control unit configured to, in a case where information about a provider providing the network is not obtained from the network detected by the detection unit, display on a display unit identification information about the network, and in a case where information about a provider providing the network is obtained from the network, display on the display unit information about the provider instead of identification information about the network.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 9B is a sequence diagram according to an exemplary embodiment.

DESCRIPTION OF EMBODIMENTS

Various exemplary embodiments, features, and aspects of the invention will be described in detail below with reference to the drawings.

Although an example is described that uses a wireless local area network (LAN) supporting the Institute of Electrical and Electronics Engineers (IEEE) 802.11 series standards, the communication mode is not limited to this. For example, a wireless network supporting Bluetooth, ultra wide band (UWB) and the like may be applied.

EXAMPLE 1

Figure 1:
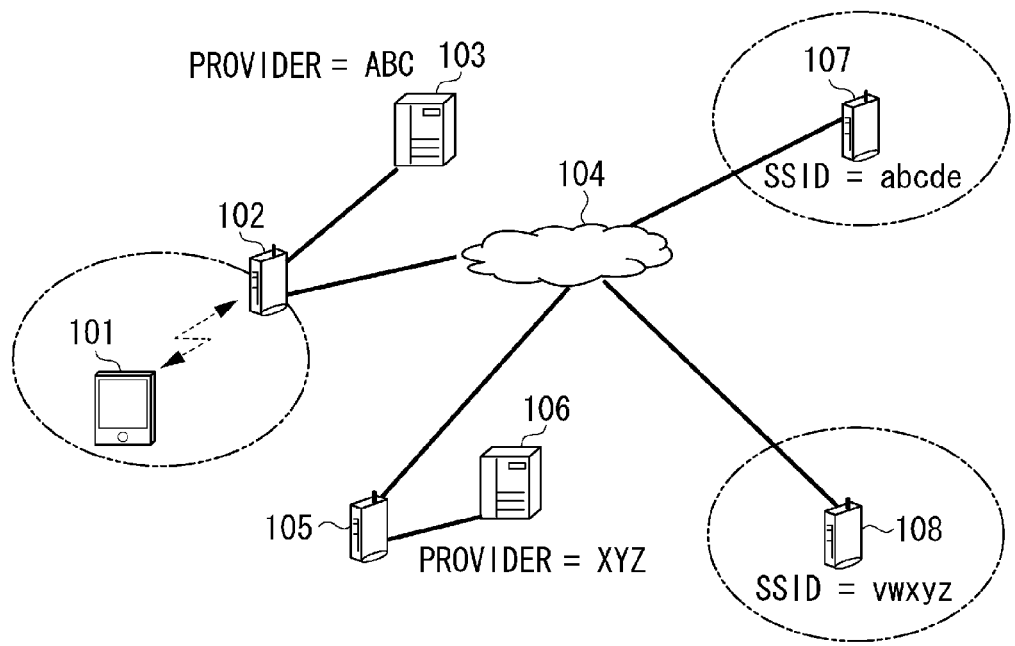
FIG. 1 is a system configuration diagram.

FIG. 1 illustrates a configuration of a wireless LAN system according to a first exemplary embodiment. A mobile terminal 101 illustrated in FIG. 1 can perform data communication with various devices by connecting to a public line 104. The mobile terminal 101 performs communication based on the IEEE 802.11 series standards. Further, the mobile terminal 101 stores account information about a public wireless LAN service operated by a provider "ABC Company". The user of the mobile terminal 101 wants to connect to the wireless network providing a public wireless LAN service operated by the provider "ABC Company".

Base stations 102 and 105 are access points that support the IEEE 802.11 series standards, and establish a wireless network for providing a public wireless LAN service. The base station 102 is wired to the public line 104 and a below-described authentication server 103. The base station 105 is wired to the public line 104 and a below-described authentication server 106. If the mobile terminal 101 is authorized by the authentication server, the mobile terminal 101 can access the public line 104, thus enabling data communication, such as Web viewing.

The authentication server 103 is operated by the provider "ABC Company", and the authentication server 106 is operated by a provider "XYZ Company". As an example of specific processing performed by the authentication server, the authentication server has a function of verifying whether a user account (a user login ID and a user password) transmitted from the mobile terminal 101 are correct. Based on the verification performed by the authentication server, if the user account is verified, a security key can be obtained. The security key is a wireless parameter required to join the wireless network established by the base station 102 or the base station 105. Using the security key, the mobile terminal 101 can wirelessly connect to the base station 102 or the base station 105.

Since the base station 102 is connected to the authentication server that is operated by the provider "ABC Company" providing a public wireless LAN service, the base station 102 provides information about the provider "ABC Company" in response to a request from the mobile terminal 101. Further, since the base station 105 is connected to the authentication server that is operated by the provider "XYZ Company" providing a public wireless LAN service, the base station 105 provides information about the provider "XYZ Company" in response to a request from the mobile terminal 101.

Base stations 107 and 108 are both different from the base station 102, and are independent base stations establishing a wireless network. An authentication server is not connected to these base stations. Consequently, to wirelessly connect to these base stations, an administrator of these base stations needs to provide the security key. Alternatively, a function referred to as Wi-Fi Protected Setup (WPS) for obtaining a wireless parameter from the base stations needs to be implemented. The SSIDs which are wireless network identifiers of the base stations 107 and 108 are set as, respectively, "abcde" and "vwxyz".

Since the base stations 107 and 108 do not provide a public wireless LAN service, these base stations do not respond even if a request for provider information is issued from the mobile terminal 101.

Figure 2:
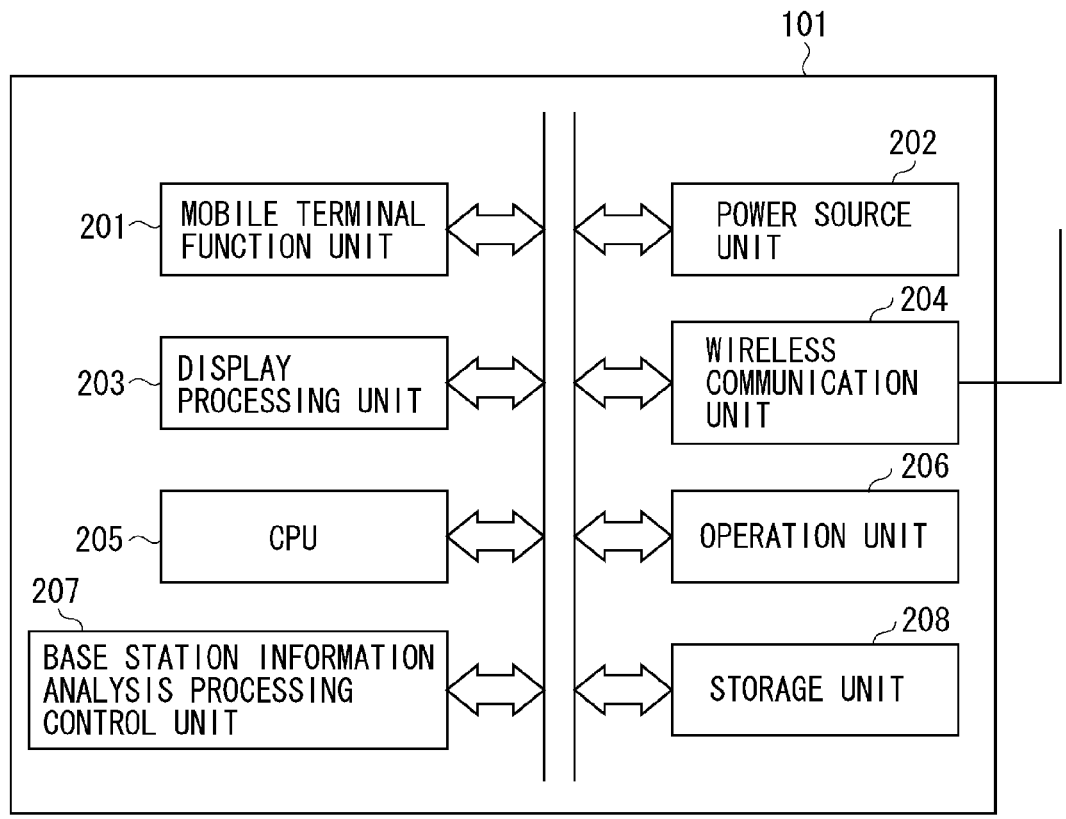
FIG. 2 is a mobile terminal function block diagram.
Figure 6A:
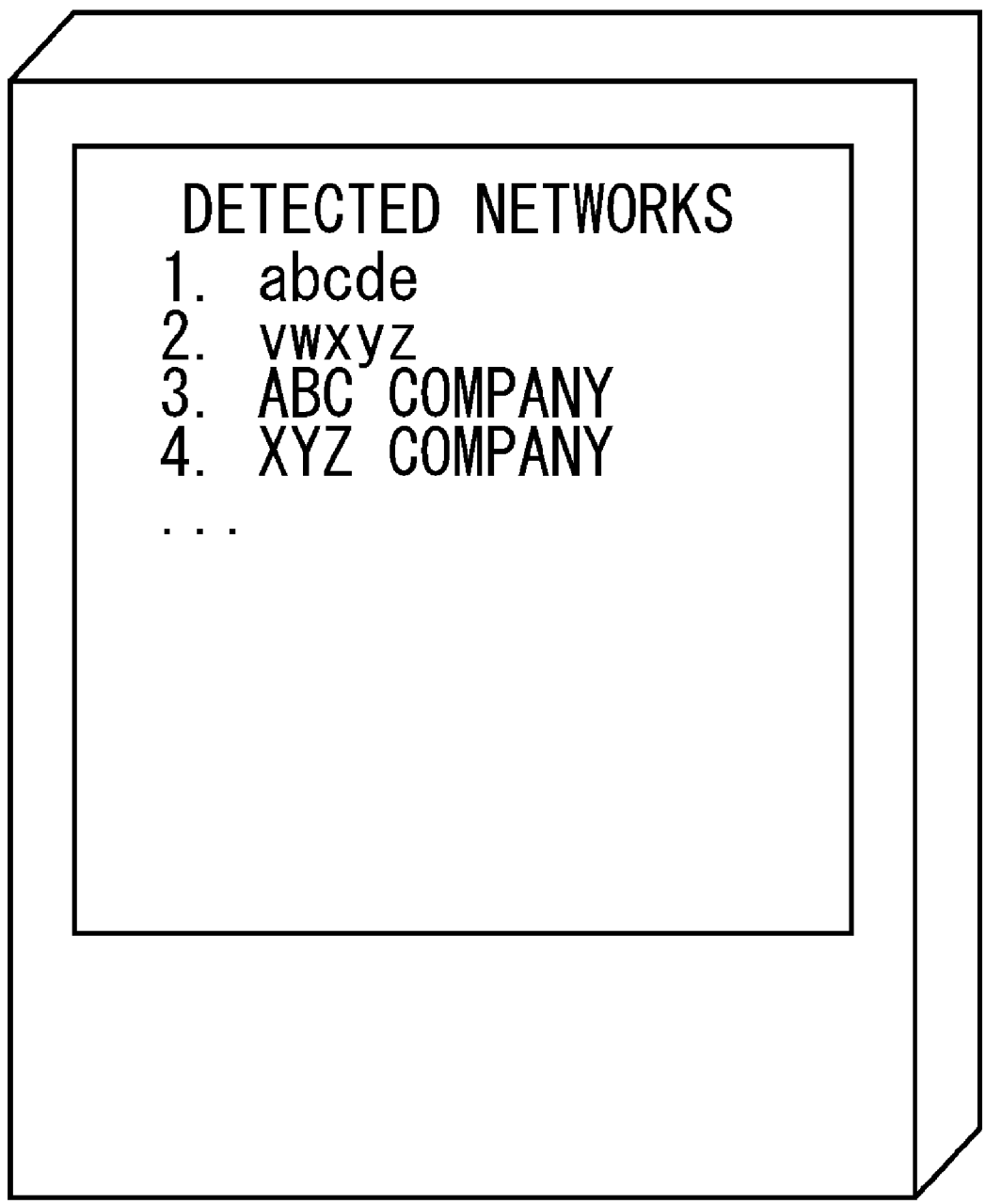
FIG. 6A illustrates a display example by a display processing unit.
Figure 6B:
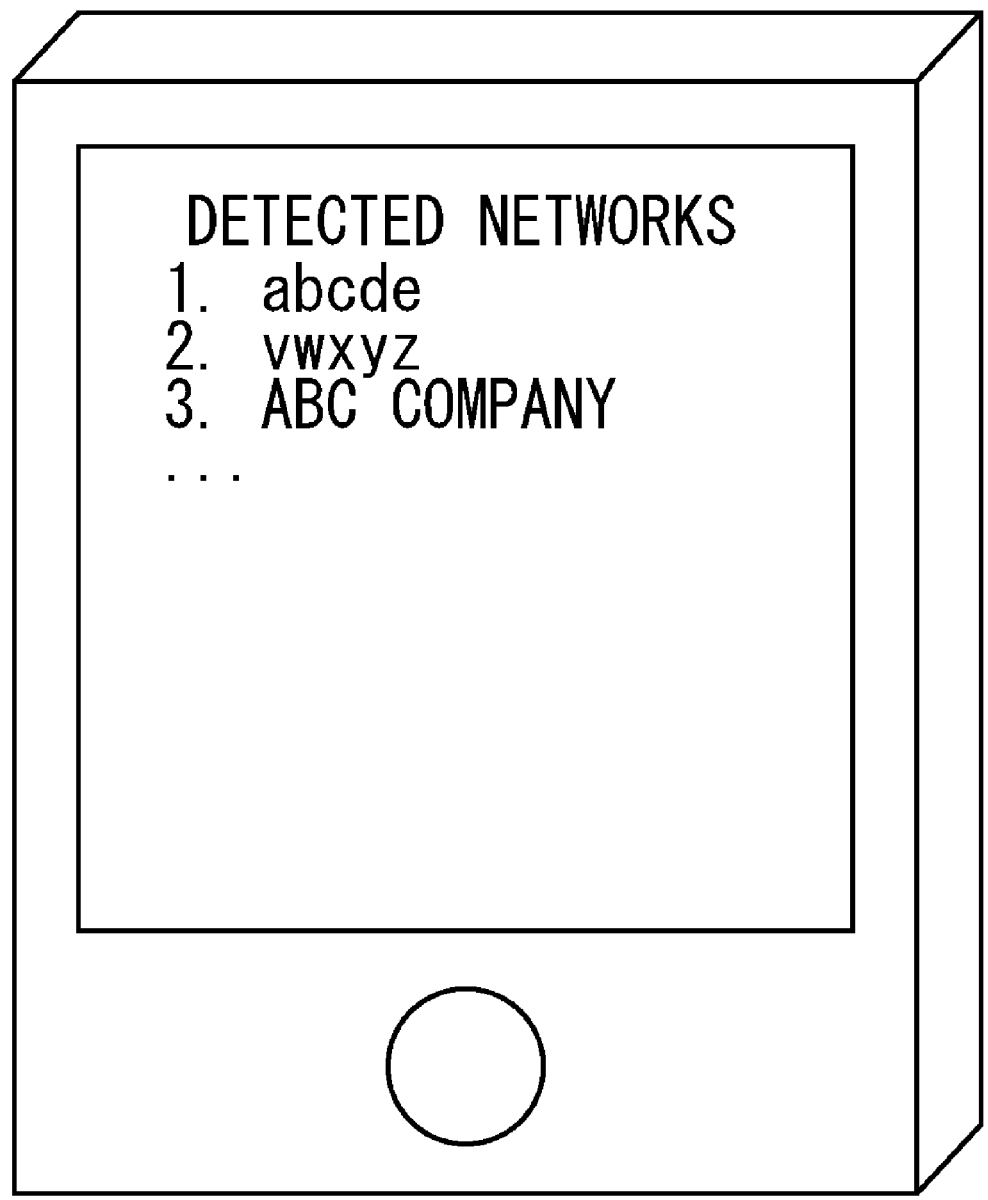
FIG. 6B illustrates a display example by a display processing unit.

FIG. 2 illustrates a block diagram of the mobile terminal 101. A mobile terminal function unit 201 is a block that actually performs the processing of the functions as a mobile terminal, for example, a telephone function and image data processing. A detailed description of the functions will be omitted here. A power source unit 202 supplies power to the functions that are required for the mobile terminal 101 to operate, such as a mobile terminal function unit and a wireless communication function unit. A display processing unit 203 which is a liquid crystal display (LCD), a light-emitting diode display or the like is a block that controls and displays as information the display content to the user relating to the wireless function. An example of the display is illustrated in FIGS. 6A and 6B. As illustrated in FIGS. 6A and 6B, a network detection result can be displayed in a user-selectable manner.

A wireless communication function unit 204 is a block for functioning as a wireless terminal based on the IEEE 802.11 series standards. More specifically, the wireless communication function unit 204 realizes wireless communication with another wireless communications device via a base station by searching for a base station and performing wireless connection processing to the base station. An operation unit 206 starts below-described network detection processing and realizes network selection processing in cooperation with the display processing unit 203. More specifically, a display unit and the operation unit 206 serve as a user interface (I/F) relating to the wireless function of the mobile terminal 101.

The processing of the blocks relating to these wireless functions is performed by a central processing unit (CPU) 205. Programs controlled by the CPU 205 are stored in a storage unit 208 configured from a random access memory (RAM) or a flash read-only memory (ROM), for example. The account information and the like about the public wireless LAN service operated by the provider "ABC Company" is also stored in the storage unit 208. A base station information analysis processing control unit 207 is a characteristic feature of the present invention. Although described in more detail below, the base station information analysis processing control unit 207 analyzes attributes of the wireless networks detected by the mobile terminal 101, and based on the analysis result, determines the optimum wireless network display method according to the connection destination that will serve as the other communication partner.

Figure 5:
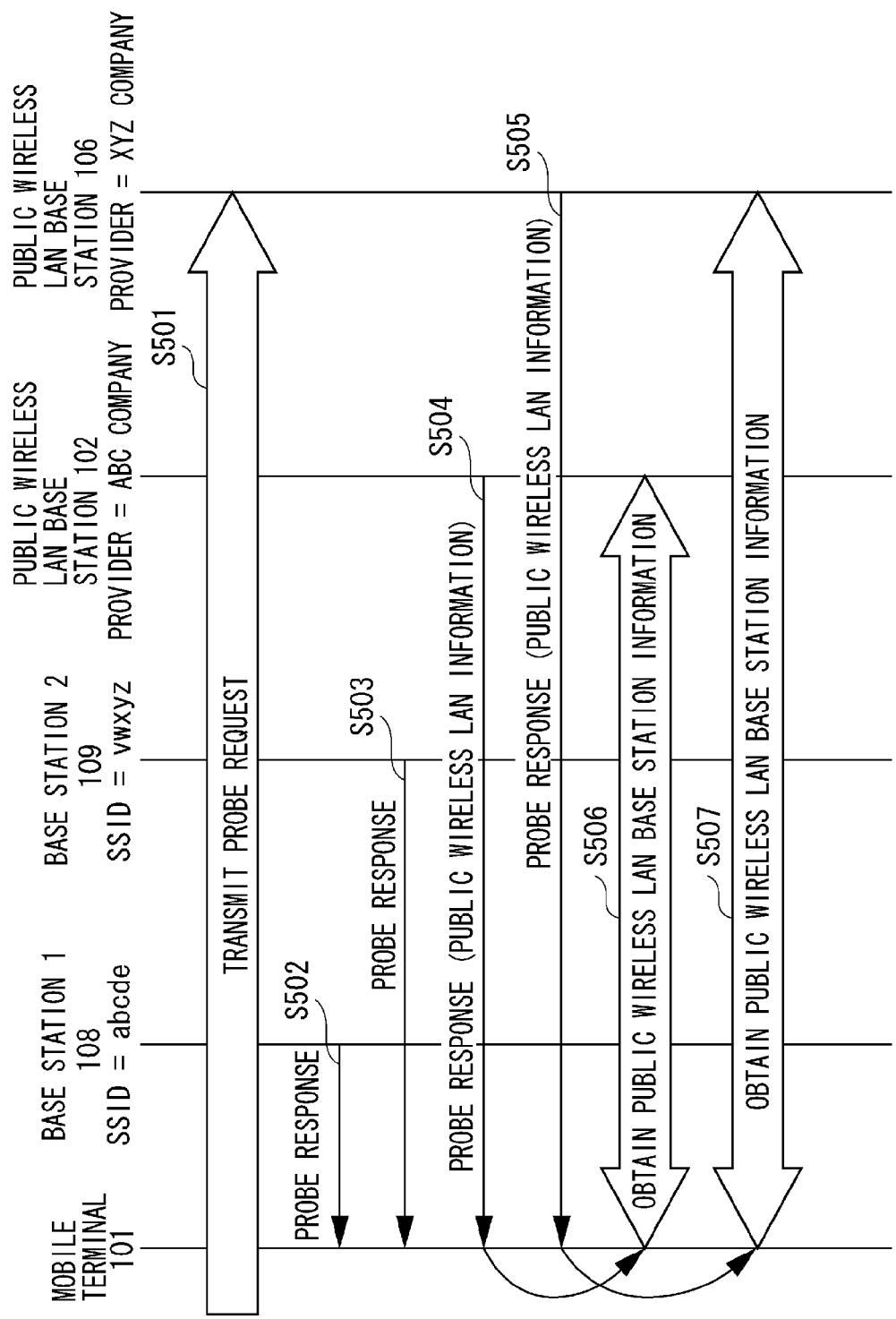
FIG. 5 is a sequence diagram according to an exemplary embodiment.

The devices configuring the system illustrated in FIG. 1 are described above. In the system illustrated in FIG. 1, the user of the mobile terminal 101 tries to perform data communication by connecting to the wireless network providing the public wireless LAN service. As described above, the user of the mobile terminal 101 possesses the account information about the public wireless LAN service operated by the provider "ABC Company". Therefore, the user of the mobile terminal 101 tries to execute connection processing to the base station 102 that is connected to the authentication server operated by the provider "ABC Company". The specific method for the processing will be described with reference to a flowchart illustrated in FIG. 3 and a sequence diagram illustrated in FIG. 5.

In step S301, the user of the mobile terminal 101 starts wireless connection processing via the display processing unit 203 and the operation unit 206, which is operating in cooperation with the display processing unit 203. In step S302 (step S501), the mobile terminal 101 in which this processing has started, starts network search processing.

More specifically, the mobile terminal 101 starts reception processing of beacons that are broadcast by the base stations that establish surrounding wireless networks, or starts reception processing of a probe response that is a response to a probe request transmitted by the mobile terminal 101.

On the other hand, the base stations that are present around the mobile terminal 101 broadcast the presence of the wireless network by transmitting a beacon or a probe response as a response to the reception of the probe request, for example. Each base station needs to broadcast whether the network operated by the base station itself provides the public wireless LAN service. As an example, the base station may include information that the public wireless LAN service is provided in a beacon or a probe response. According to the present exemplary embodiment, the base station 102 and the base station 105 do include the information that the public wireless LAN service is provided in their respective beacons or probe responses. Since the base station 107 and the base station 108 do not provide the public wireless LAN service, they do not particularly include such information in their respective beacons or probe responses.

In step S303 (steps S502 to S505), if the mobile terminal 101 receives a beacon or a probe response from the surrounding wireless network (YES in step S303), the processing proceeds to step S304. In step S304, the base station information analysis processing control unit 207 analyzes the received beacon or probe response. In the wireless network detected during the analysis processing, the mobile terminal 101 conforms the presence of the base station establishing the wireless network providing the public wireless LAN service. Further, the mobile terminal 101 performs extraction processing of the "SSID" information, for example, of the wireless network. In addition, the security information, radio wave strength, channel, and transmission rate information of the wireless network may also be extracted in step S304.

In the above-described analysis processing, if the base station establishing the wireless network providing the public wireless LAN service is not detected (NO in step S305), in step S310, the mobile terminal may notify the user of the wireless network information by displaying a list of the extracted information pieces on the display processing unit 203. In step S305, the presence of the wireless network providing the public wireless LAN service can be confirmed based on the analysis result of the beacons or the probe responses from the base station 102 and the base station 105.

Regarding the wireless networks established by the base station 102 and the base station 105, the provider that is providing the public wireless LAN service cannot be learned just from the analysis performed by the base station information analysis processing control unit 207 and the extracted wireless network information pieces. Therefore, at this point, the user cannot select the desired wireless network even if the mobile terminal 101 displays the detected wireless network information on the display processing unit 203. Accordingly, in step S306 (S506 and S507), the mobile terminal 101 makes a request to the base station 102 and the base station 105 for information about the provider providing the public wireless LAN service.

The base station 102 and the base station 105 that have received the request for provider information transmit a response including information about the provider providing the public wireless LAN service established by the respective base stations (steps S506 and S507). The base stations may respond directly, or may make an inquiry to the authentication server about the request, and transmit an answer from the authentication server to the mobile terminal that made the original inquiry.

In step S307, if provider information is obtained from the base station 102 and the base station 105 (YES in step S307), the processing proceeds to step S308. In step S308, as illustrated in FIG. 6A, the mobile terminal 101 displays the SSID information for the base station 108 and the base station 109, and displays the provider information for the base station 102 and the base station 105.

As described above, the user of the mobile terminal 101 possesses account information (which represents a user ID and a password, for example) about the public wireless LAN service operated by the provider "ABC Company". More specifically, in step S309, by looking at the wireless network information displayed on the display processing unit 203, the user of the mobile terminal 101 can easily select the base station 102 providing the public wireless LAN service operated by the provider "ABC Company".

Among public wireless LAN services, there is a service can be mutually utilized by different providers based on a technology called "roaming" For example, for the provider "ABC Company" and the provider "XYZ Company", it is assumed that the public wireless LAN services provided by the respective providers can be used based on the above-described account information about the public wireless LAN service. In addition, some providers provide a public wireless LAN service without requiring an account or a usage fee. In view of this, the provider information displayed on the display processing unit 203 by the mobile terminal 101 will be described in more detail with reference to a flowchart in FIG. 4.

The base station information analysis processing control unit 207 of the mobile terminal 101 starts processing for an optimal display when displaying provider information on the display processing unit 203. In step S402, if the base station information analysis processing control unit 207 determines that the services provided by the provider "ABC Company" and the service provided by the provider "XYZ Company" cannot be interoperably used (NO in step S402), the processing proceeds to step S410. In step S410, the base station information analysis processing control unit 207 of the mobile terminal 101 displays all pieces of the provider information on the display processing unit 203.

Here, it is described the case that the base station information analysis processing control unit 207 determines that the service provided by the provider "ABC Company" and the service provided by the provider "XYZ Company" can be interoperably used (YES in step S402), and there is the provider information about interoperable providers. In step S403, the provider "ABC Company" and the provider "XYZ Company" can interoperably use the respective services, and the provider "ABC Company" is the account issuing provider. Then, in step S404, the base station information analysis processing control unit 207 confirms the radio wave condition of the base station operated by the provider "ABC Company". If it is determined that the radio wave condition is good (YES in step S404), in step S405, the base station information analysis processing control unit 207 determines that only the provider "ABC Company" should be displayed on the display processing unit 203. Then, in step S406, the provider "ABC Company" is displayed as illustrated in FIG. 6B.

On the other hand, if it is determined that the radio wave condition of the base station 102 operated by the provider "ABC Company" is not good (NO in step S404), the processing proceeds to step S407. In step S407, the base station information analysis processing control unit 207 analyzes the public wireless LAN service operated by the provider "XYZ Company" to determine whether the service costs a new usage fee. If the provider "XYZ Company" does not charge a new usage fee (NO in step S407), and if it is determined in step S408 that the radio wave condition is good (YES in step S408), then in step S409, the base station information analysis processing control unit 207 determines to display the provider "XYZ Company" on the display processing unit 203. Whereas if the provider "XYZ Company" charges a fee for the usage of the public wireless LAN service (YES in step S407), or if it is determined in step S408 that the radio wave condition is not good (NO in step S408), the processing proceeds to step S410. In step S410, it is desirable that the radio wave condition and the usage fees are added to the detected provider information, and all pieces of the provider information are displayed. Although the determination criteria are described using the radio wave condition as an example, the determination can also be performed based on the network condition of the wireless network and the like.

Although according to the present exemplary embodiment, the "ABC Company" is present in the plurality of detected provider information pieces, if, for example, the "ABC Company" is not present in the detected provider information (NO in step S403), the base station information analysis processing control unit 207 determines whether a new usage fee is charged by the detected provider information in step S407, and determines the radio wave condition in step S408. Accordingly, in step S409, the base station information analysis processing control unit 207 selects the provider to be displayed. In the above processing in steps S407 and S408, if the providers cannot be narrowed down, in step S410, it is desirable that the radio wave condition and the usage fees are added to the detected provider information, and all pieces of the provider information are displayed.

In a case that a plurality of wireless networks providing the public wireless LAN service operated by the provider "XYZ Company" is detected, it is easy for the user to select if only one of the network information is displayed rather than displaying all the network information pieces. Further, if the user selected the public wireless LAN service, connection may be established by selecting the network having the best radio wave condition among the plurality of networks of the same provider.

According to the above-described method, the user of the mobile terminal 101 can easily extract the wireless network to connect to when using a public wireless LAN service. The user of the mobile terminal 101 can perform data communication by smoothly utilizing a public wireless LAN service that requires less time to connect to due to a reduction in connection testing.

The mobile terminal 101 stores account information about the public wireless LAN service operated by the provider "ABC Company". In such a case, when the network provided by the provider "ABC Company" is detected, the mobile terminal 101 may display the "ABC Company" as provider information, and automatically connect to the network provided by the "ABC Company". Consequently, the mobile terminal 101 can connect to the network based on the account information obtained by the user, without the user having to select the connection destination. Further, since the user is notified of information about the provider providing the network that the mobile terminal 101 connected to, the user can learn of the fact that the mobile terminal 101 is connected to the network of the provider "ABC Company" for which he/she has obtained the account.

Figure 3:
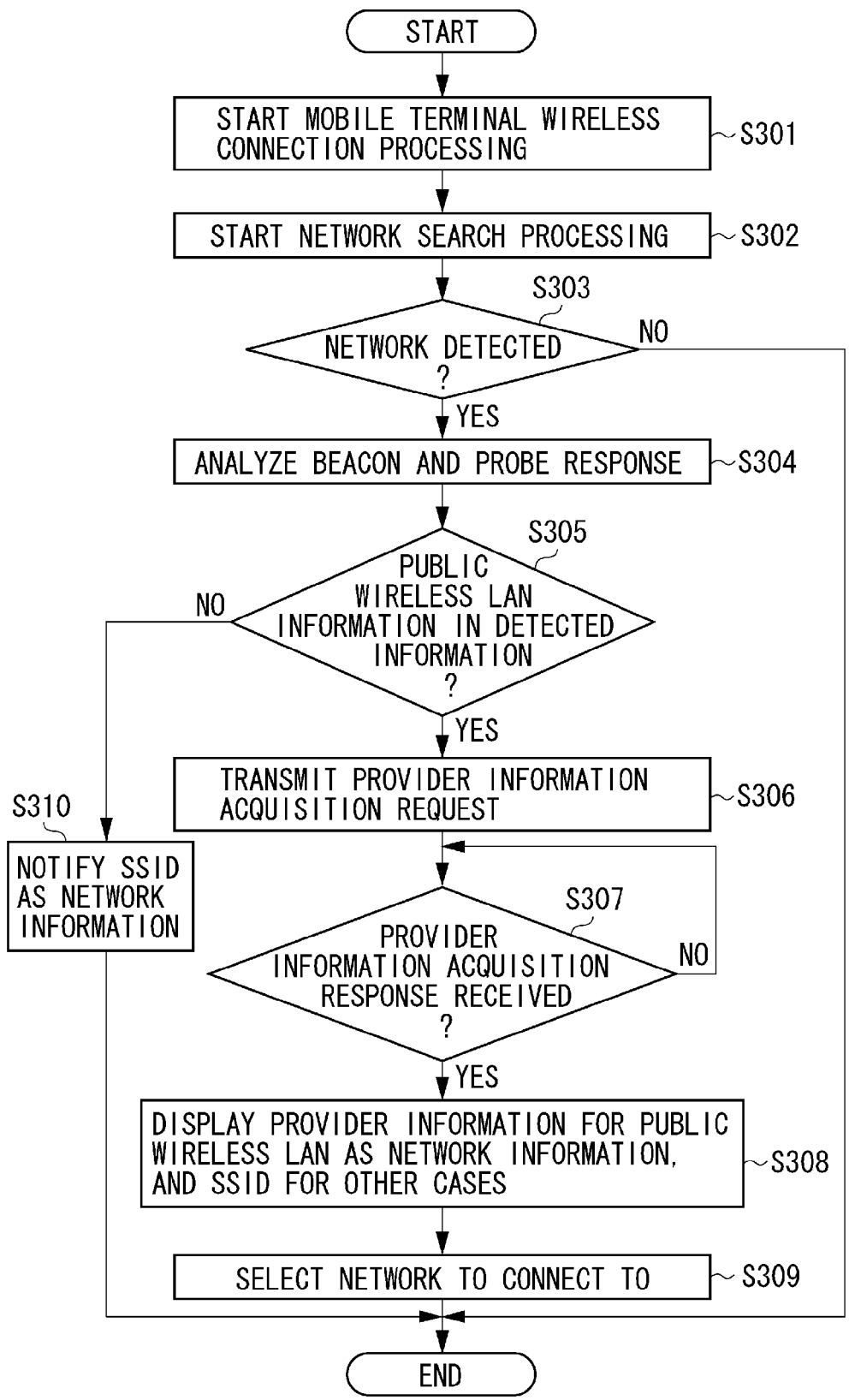
FIG. 3 is a flowchart illustrating processing realized by a mobile terminal.
Figure 4:
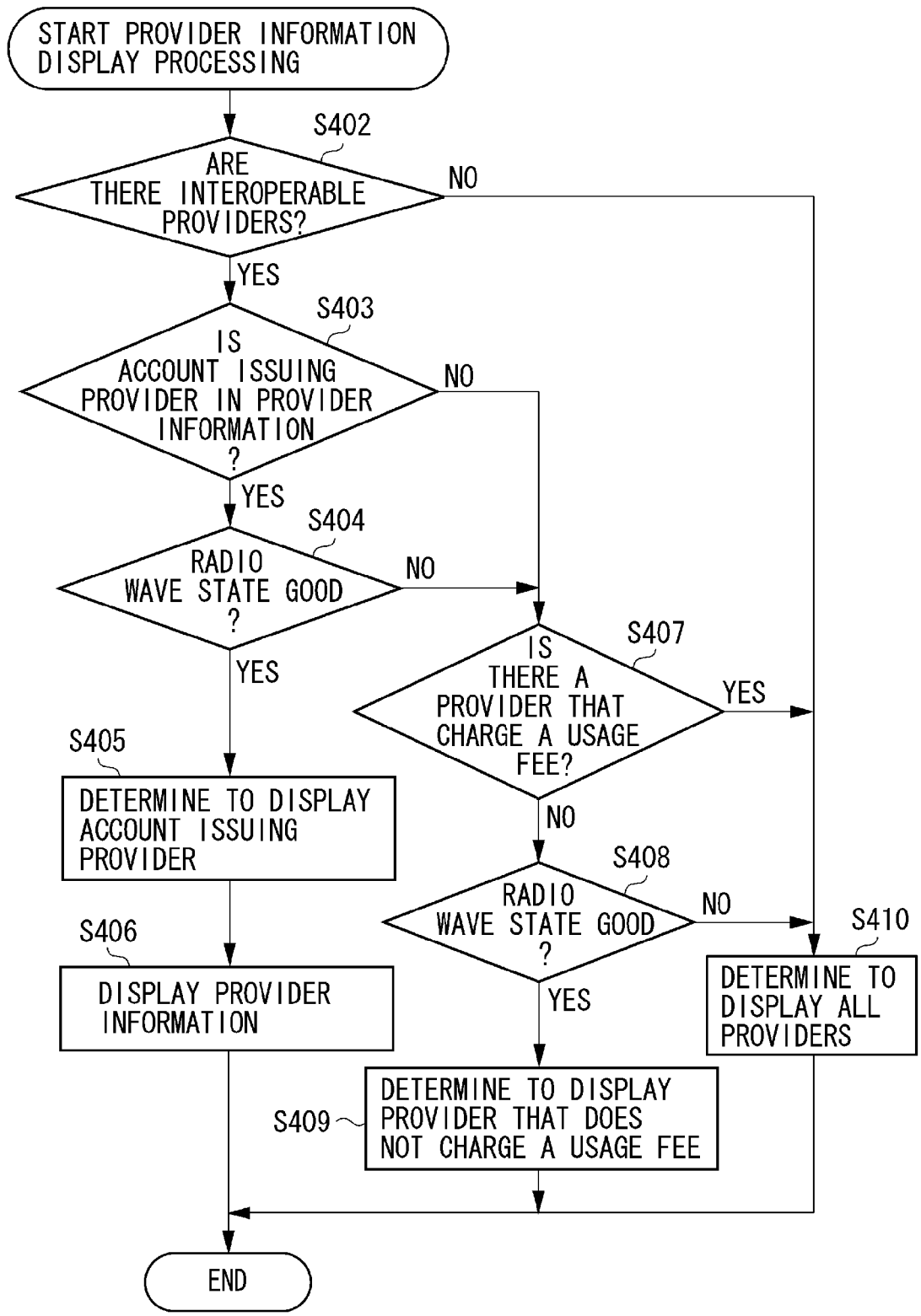
FIG. 4 is a flowchart illustrating processing realized by a mobile terminal.

Further, the mobile terminal 101 may be configured to detect networks having a good radio wave condition in step S303 in FIG. 3, so that the processing in step S404 in FIG. 4 does not have to be performed. In this case, if it is determined in step S403 that there is an account issuing provider, in step S405, the information about the account issuing provider is displayed.

Similarly, the mobile terminal 101 may also be configured to detect networks having a good radio wave condition in step S303 in FIG. 3 so that the processing in step S408 in FIG. 4 does not have to be performed. In this case, if it is determined in step S407 that there is a provider that does not charge a usage fee, in step S409, the information about the provider that does not charge a usage fee is displayed.

EXAMPLE 2

According to the first exemplary embodiment, the use of a public wireless LAN service is enabled by searching for wireless networks around the mobile terminal 101, and selecting the public wireless LAN service from among the detected wireless networks. According to a second exemplary embodiment, a method will be described for easily improving operability by causing a user to designate in advance whether he/she will use a public wireless LAN service. A configuration of a system used in the present exemplary embodiment is the same as that described in the first exemplary embodiment. Further, a mobile terminal 101 used in the present exemplary embodiment is also the same as that used in the first exemplary embodiment.

Figure 7:
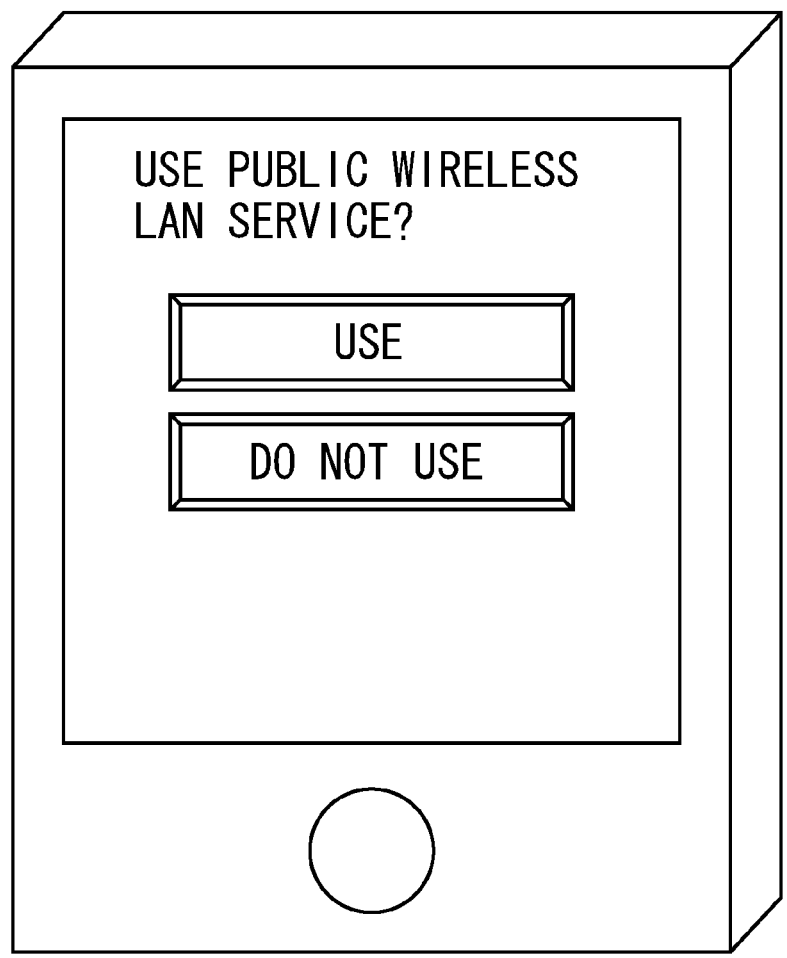
FIG. 7 illustrates a display example by a display processing unit.
Figure 8:
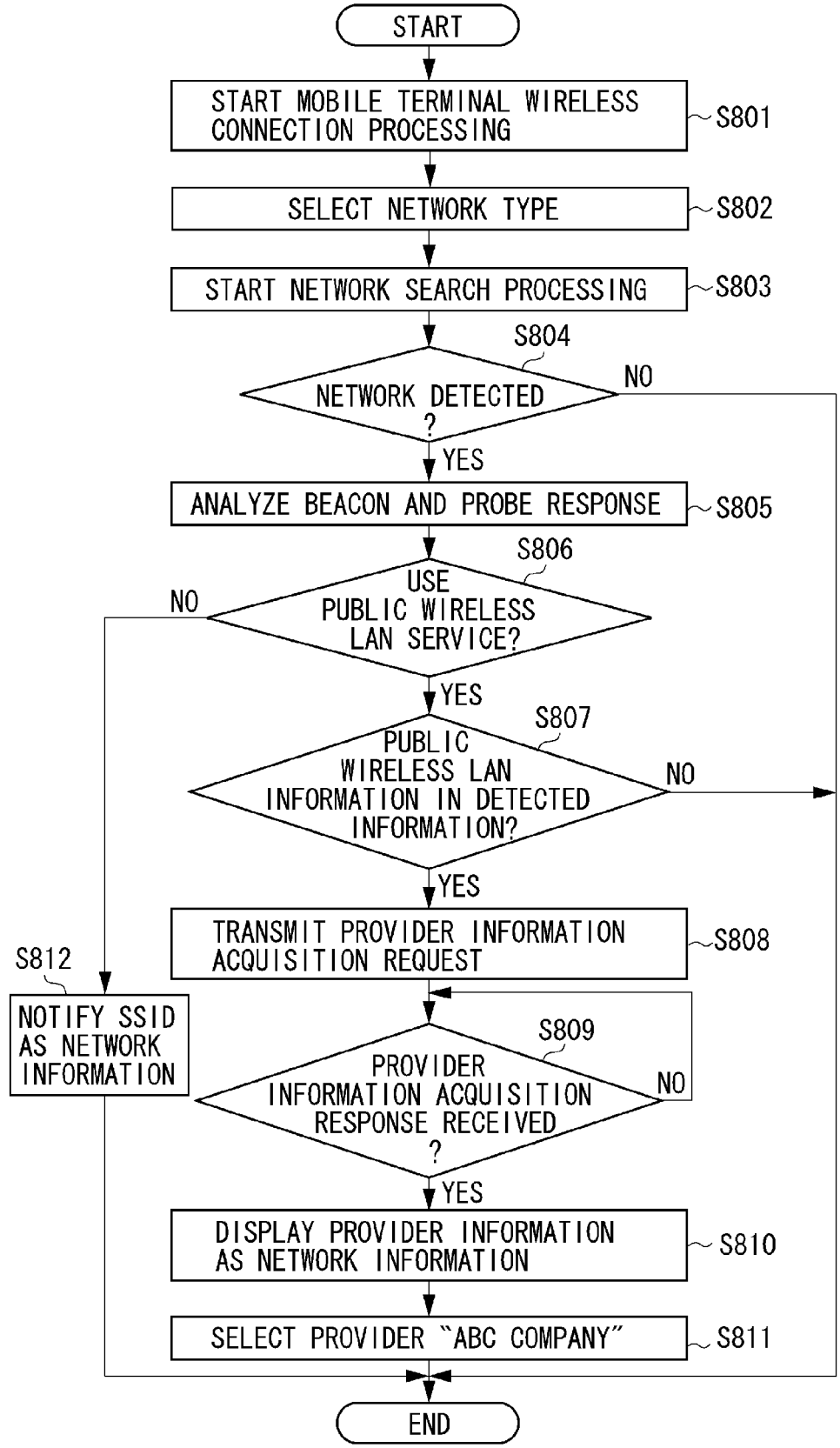
FIG. 8 is a flowchart illustrating processing realized by a mobile terminal.
Figure 9A:
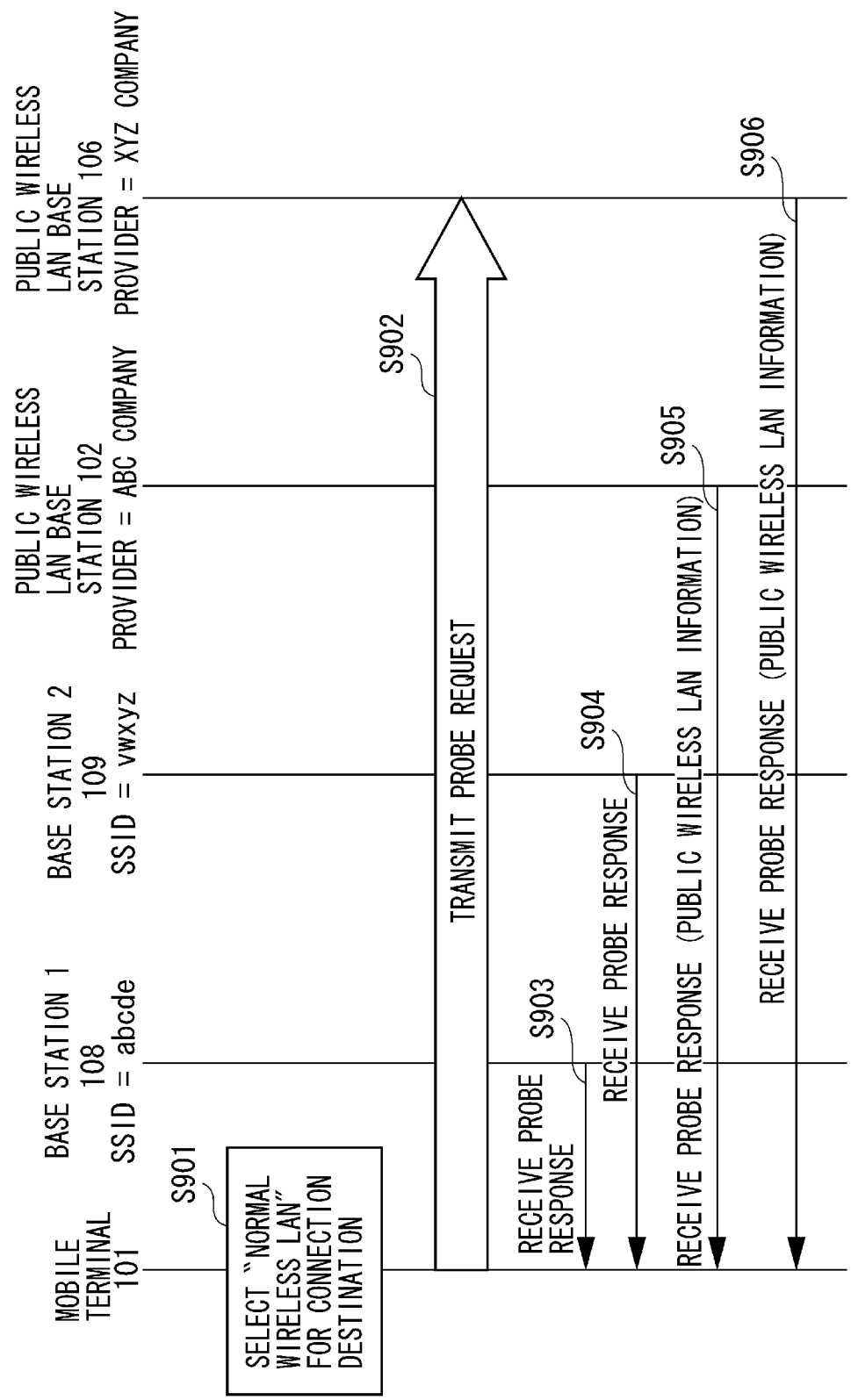
FIG. 9A is a sequence diagram according to an exemplary embodiment.

The specific method for the processing according to the present exemplary embodiment will be described with reference to a flowchart illustrated in FIG. 8 and sequence diagrams illustrated in FIGS. 9A and 9B. In step S801, a user of the mobile terminal 101 starts wireless connection processing via the display processing unit 203 and the operation unit 206 which operates in cooperation with the display processing unit 203. In step S802, the mobile terminal 101 in which the wireless connection processing has been started displays a selection screen as illustrated in FIG. 7 to request the user of the mobile terminal 101 to select whether to use a public wireless LAN service.

First, a case will be described in which, in step S901 in FIG. 9A, the user selects to "not use" a public wireless LAN service. In step S802, the mobile terminal 101 receives a selection result of the wireless network type. In step S803, the mobile terminal 101 starts network search processing. Since the specific search method and the method for broadcasting network information by base stations are similar to those described in the first exemplary embodiment, a detailed description thereof will be omitted here (steps S902 to 906).

In step S804, if the mobile terminal 101 detects a surrounding wireless network (YES in step S804), in step S805, the mobile terminal 101 starts analysis of a beacon or a probe response received by the base station information analysis processing control unit 207. In this case, in step S806, the user does not want to use a public wireless LAN service (NO in step S806). Therefore, the mobile terminal 101 does not perform analysis processing on the information obtained from the beacons or the probe responses from the base station 102 and the base station 105 which include information that a public wireless LAN service is provided.

Figure 10A:
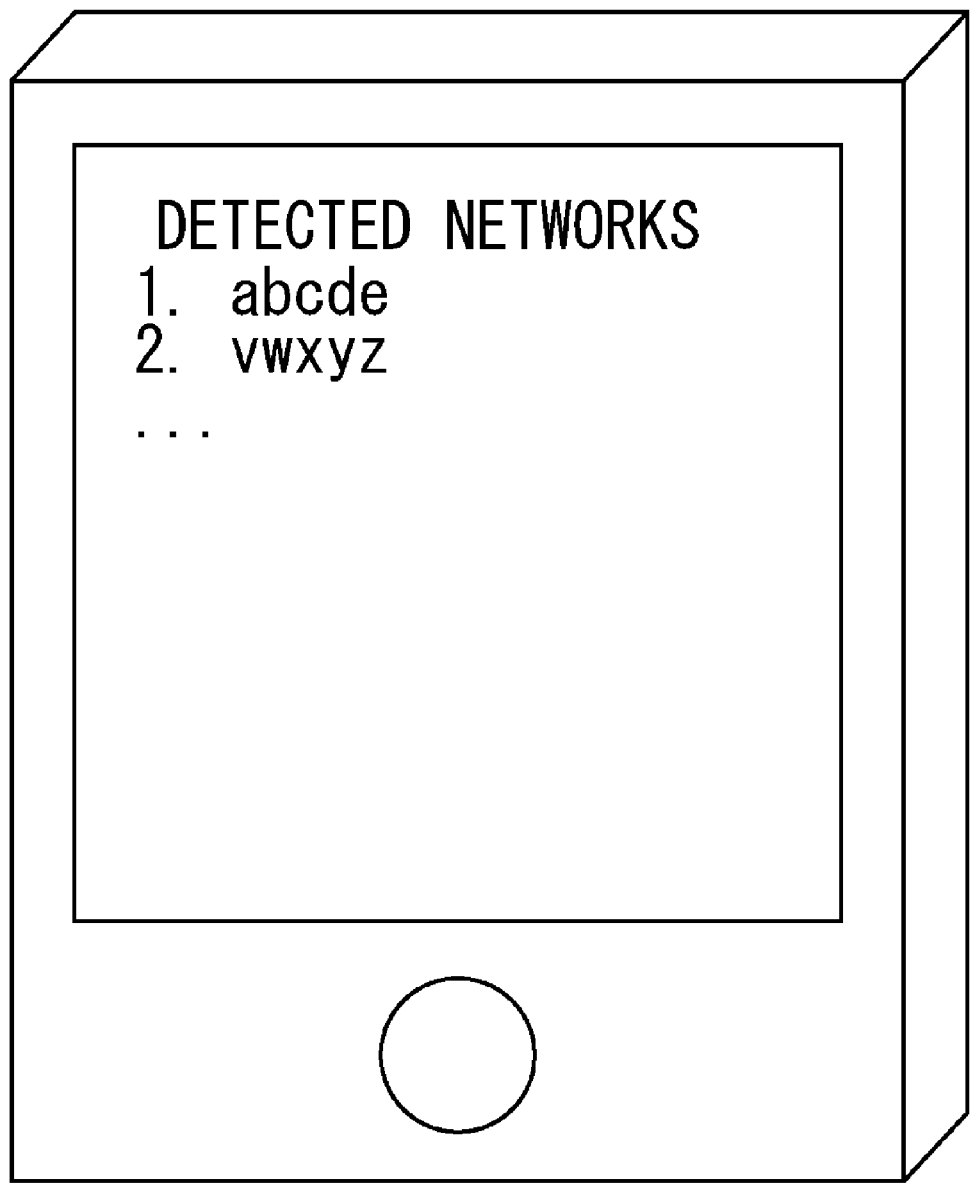
FIG. 10A illustrates a display example by a display processing unit.

The extraction processing of the "SSID" information of the wireless network is performed only on the base station 107 and the base station 108 which do not include information that a public wireless LAN service is provided. As the analysis processing, security information, a radio wave strength, a channel, and transmission rate information of the wireless network may also be extracted. As illustrated in FIG. 10A, in step S812, the mobile terminal 101 that has finished the analysis processing displays on the display processing unit 203 only the SSID information of the wireless network established by the base station 107 and the base station 108. Therefore, the user of the mobile terminal can select only a wireless network that does not provide a public wireless LAN service.

Next, a case will be described in which, in step S907 in FIG. 9B, the user selects to "use" a public wireless LAN service. In step S802, the mobile terminal 101 receives a selection result of the wireless network type. In step S803, the mobile terminal 101 starts network search processing. Since the specific search method and the method for broadcasting network information by base stations are similar to those described in the first exemplary embodiment, a detailed description thereof will be omitted here (steps S908 to 912).

In step S804, if the mobile terminal 101 detects a surrounding wireless network (YES in step S804), in step S805, the mobile terminal 101 starts analysis of a beacon or a probe response received by the base station information analysis processing control unit 207. In this case, in step S806, the user wants to use a public wireless LAN service (YES in step S806). Therefore, the mobile terminal 101 does not perform analysis processing on the beacons or the probe responses that do not include information that a public wireless LAN service is provided. More specifically, the analysis target of the base station information analysis processing control unit 207 are the beacons and the probe responses from the base station 102 and the base station 105.

In step S807, if the presence of a wireless network providing a public wireless LAN service is confirmed (YES in step S807), the processing proceeds to step S808 (S913 and S914). In step S808, the mobile terminal 101 issues a request to the base station 102 and the base station 105 for information about the provider that is operating the public wireless LAN service.

The base station 102 and the base station 105 that have received the request for provider information transmit a response about the provider that operates the public wireless LAN service established by the respective base stations. The base stations may respond directly, or may make an inquiry to the authentication server about the request, and transmit an answer from the authentication server to the mobile terminal that made the original inquiry.

Figure 10B:
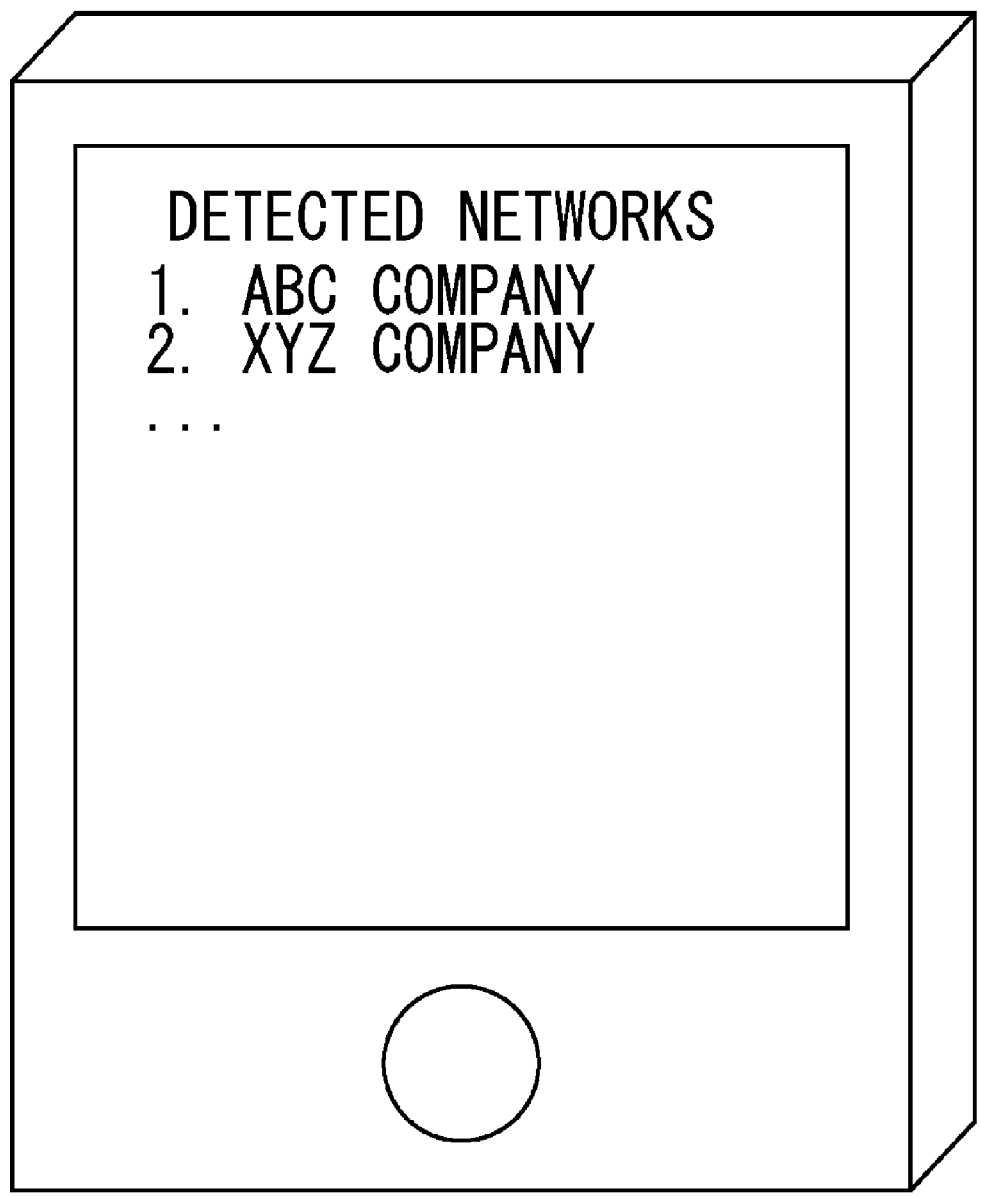
FIG. 10B illustrates a display example by a display processing unit.

In step S809, if the mobile terminal 101 receives provider information from the base station 102 and the base station 105 (YES in step S809), in step S810, the mobile terminal 101 displays provider information as illustrated in FIG. 10B on the display processing unit 203. As described in the first exemplary embodiment, the display may be based on a roaming state, or may reflect whether a service usage fee is charged.

As described above, the user of the mobile terminal 101 possesses the account information about the public wireless LAN service operated by the provider "ABC Company". More specifically, in step S811, by looking at the wireless network information displayed on the display processing unit 203, the user of the mobile terminal 101 can easily select the base station 102 providing the public wireless LAN service operated by the provider "ABC Company".

As described above, according to the present exemplary embodiment, the optimum wireless network can be displayed based on the wireless network type that the user wants to connect to. The processing can be expected to have an effect of enabling only desired base stations to be displayed on a limited display function as a result of filtering. Therefore, the user of the mobile terminal 101 can utilize a wireless network more smoothly.

Figure 11:
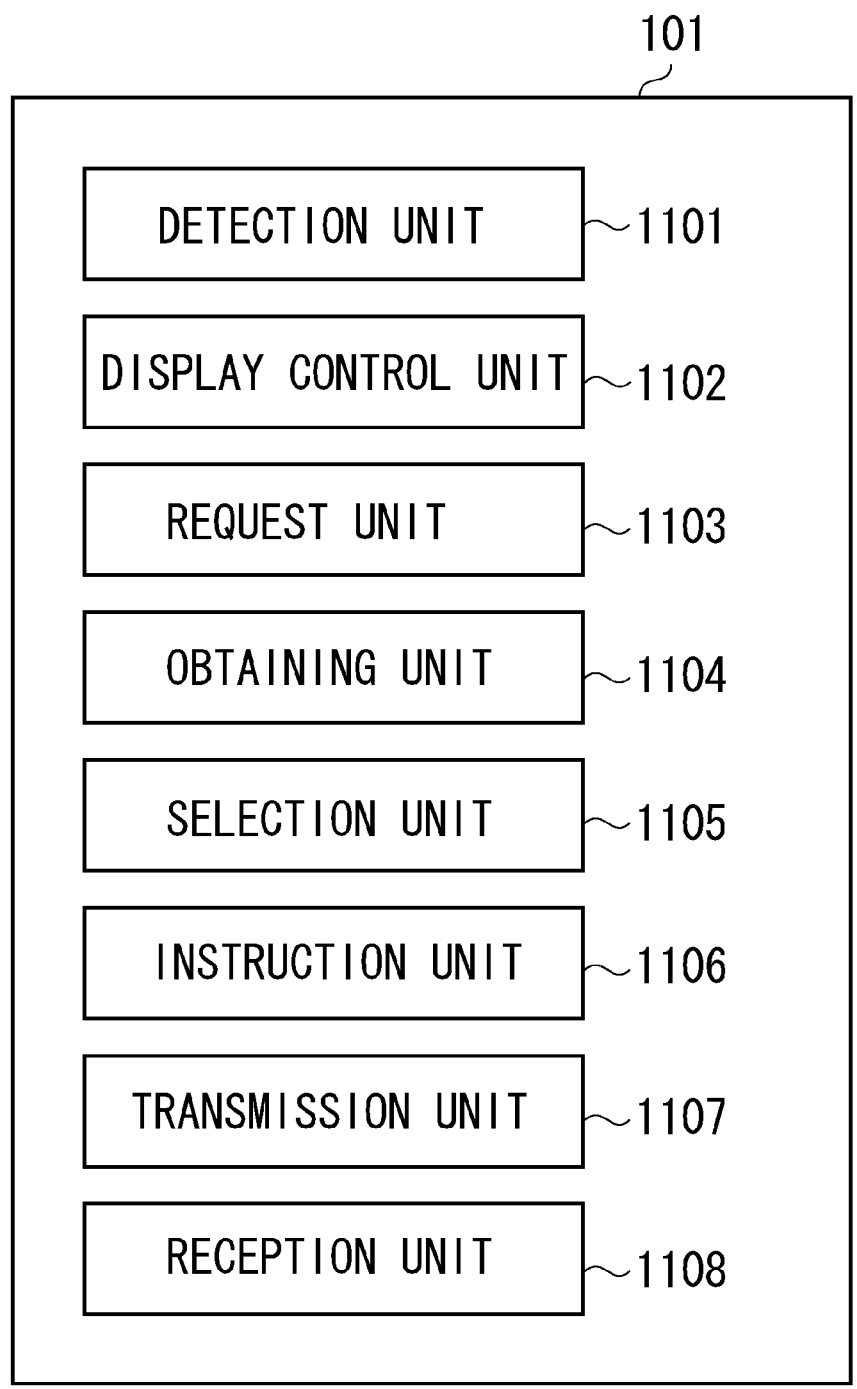
FIG. 11 is a function block diagram of a mobile terminal.

The above-described configuration also can be realized by a software configuration illustrated in FIG. 11. The software configuration illustrated in FIG. 11 is realized by the CPU 205 reading and executing programs stored in the storage unit 208. Examples of the storage unit 208 storing the programs include, in addition to a ROM and a RAM, storage media such as a flexible disk, a hard disk, an optical disc, a magneto-optical disk, a compact disc ROM (CD-ROM), a CD-recordable (CD-R), a magnetic tape, a nonvolatile memory card, and a digital versatile disc (DVD).

A detection unit 1101 detects the networks that are present around the mobile terminal 101. When a network detected by the detection unit 1101 does not transmit information about the provider that provides the network, a display control unit 1102 displays identification information about the network on the display processing unit 203. Further, when a network detected by the detection unit 1101 transmits information about the provider that provides the network, the display control unit 1102 displays transmitted information about the provider on the display processing unit 203 instead of identification information about the network. Further, the display control unit 1102 displays on the display unit information about some providers among a plurality of network providers based on a predetermined condition. For example, the display control unit 1102 displays on the display unit information about the provider that issues an account to a user. Further, for example, the display control unit 1102 displays on the display unit information about providers that do not charge a usage fee.

A request unit 1103 makes a request for information about a network provider when information about the provider providing the network can be obtained from a network detected by the detection unit 1101. An obtaining unit 1104 obtains information about a network provider as a response to the request from the request unit 1103. A selection unit 1105 selects the provider that issues the user with an account. The selection unit 1105 also selects a provider that does not charge a usage fee. An instruction unit 1106 lets the user instruct whether he/she wants to use a public wireless LAN or not. A transmission unit 1107 transmits a search request (probe request) to the networks detected by the detection unit 1101. A reception unit 1108 receives a search response (probe response) as a response from the base station to the search request transmitted by the transmission unit 1107.

The above-described effects of the present application can also be obtained by using a part of the software configuration or the hardware configuration.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. A communication apparatus comprising:
   a detection unit configured to detect a network; and
   a display control unit configured to cause a display unit to display information,
   wherein, in a case where information about a provider providing a network is not obtained from the network detected by the detection unit, the display control unit is configured to cause the display unit to display identification information about the network and,
   wherein, in a case where information about a provider providing the network is obtained from the network, the display control unit is configured to cause the display unit to display information about the provider instead of causing identification information about the network to be displayed.

2. The communication apparatus according to claim 1, further comprising:
   a request unit configured to request information about the provider to the network; and
   an obtaining unit configured to obtain information about the provider as a response to the request by the request unit,
   wherein the display control unit is configured to cause the display unit to display information about the provider obtained by the obtaining unit.

3. The communication apparatus according to claim 2, further comprising:
   a transmission unit configured to transmit a search request to a network detected by the detection unit; and
   a reception unit configured to receive a search response as a response to the search request,
   wherein the request unit is configured to request information about the provider according to the search response received by the reception unit.

4. The communication apparatus according to claim 1, wherein, in a case where a plurality of networks is detected by the detection unit and information about a plurality of network providers is obtained, the display control unit is configured to cause the display unit to display information about a part of the providers among the plurality of network providers based on a predetermined condition.

5. The communication apparatus according to claim 4, further comprising a selection unit configured to select, from among the plurality of network providers, a provider that issues a user account, wherein the display control unit is configured to cause the display unit to display information about the provider selected by the selection unit.

6. The communication apparatus according to claim 5, wherein the display control unit is configured to cause the display unit to display information about the plurality of network providers according to a radio wave condition of the network provided by the provider selected by the selection unit.

7. The communication apparatus according to claim 4, further comprising a selection unit configured to select, from among the plurality of network providers, a provider that does not charge a usage fee, wherein the display control unit is configured to cause the display unit to display information about the provider selected by the selection unit.

8. The communication apparatus according to claim 1, further comprising an instruction unit configured to let a user instruct whether to utilize a public wireless local area network (LAN), wherein, in a case where a user issues an instruction to utilize a public wireless LAN via the instruction unit, the display control unit is configured to cause the display unit to display information about a network provider which can obtain information about providers providing a network from among the networks detected by the detection unit.

9. The communication apparatus according to claim 1, further comprising: a storage unit configured to store account information for connecting to a network provided by a provider; and a connection unit configured to connect, in a case where a network provided by the provider that issues the account information stored in the storage unit is detected by the detection unit, to the network provided by the provider.

10. A method for controlling a communication apparatus, the method comprising:
    detecting a network; and
    causing a display unit to display information,
    wherein, in a case where information about a provider providing a network is not obtained from the detected network, causing information to be displayed includes causing the display unit to display identification information about the network and,
    wherein, in a case where information about a provider providing the network is obtained from the network, causing information to be displayed includes causing the display unit to display information about the provider instead of causing identification information about the network to be displayed.

11. A storage medium storing a program to cause a communication apparatus to perform the method according to claim 10.

* * * * *